Oct. 30, 1945.  B. C. COWLEY  2,387,747
MACHINE FOR AND A METHOD OF MAKING FILLED CAPSULES
Filed March 4, 1944  4 Sheets-Sheet 1
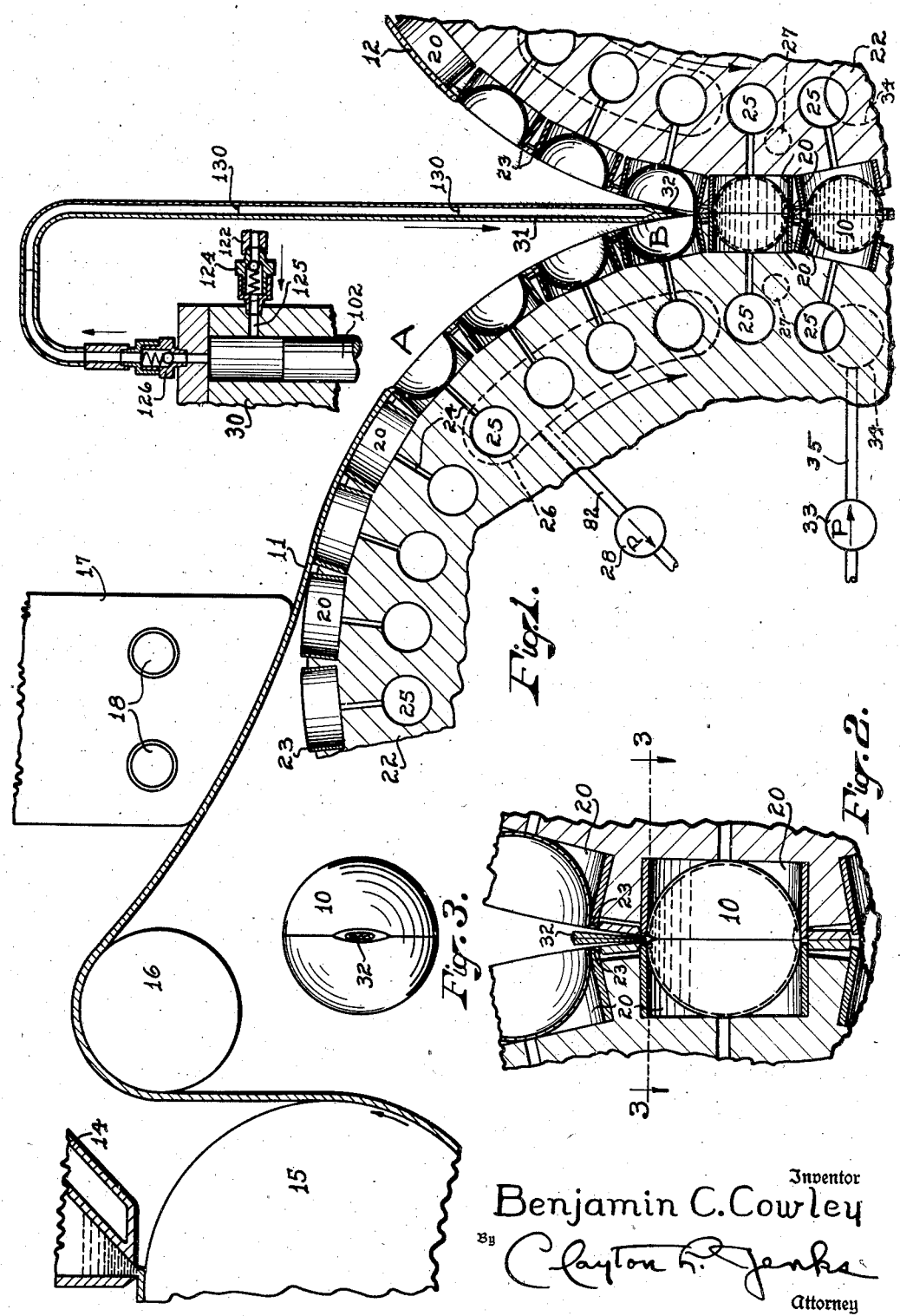
Inventor
Benjamin C. Cowley
By Clayton L. Jenks
Attorney Oct. 30, 1945.  B. C. COWLEY  2,387,747
MACHINE FOR AND A METHOD OF MAKING FILLED CAPSULES
Filed March 4, 1944  4 Sheets-Sheet 2

Inventor
Benjamin C. Cowley
By Clayton R. Jenks
Attorney

Witness
Herbert E. Covey

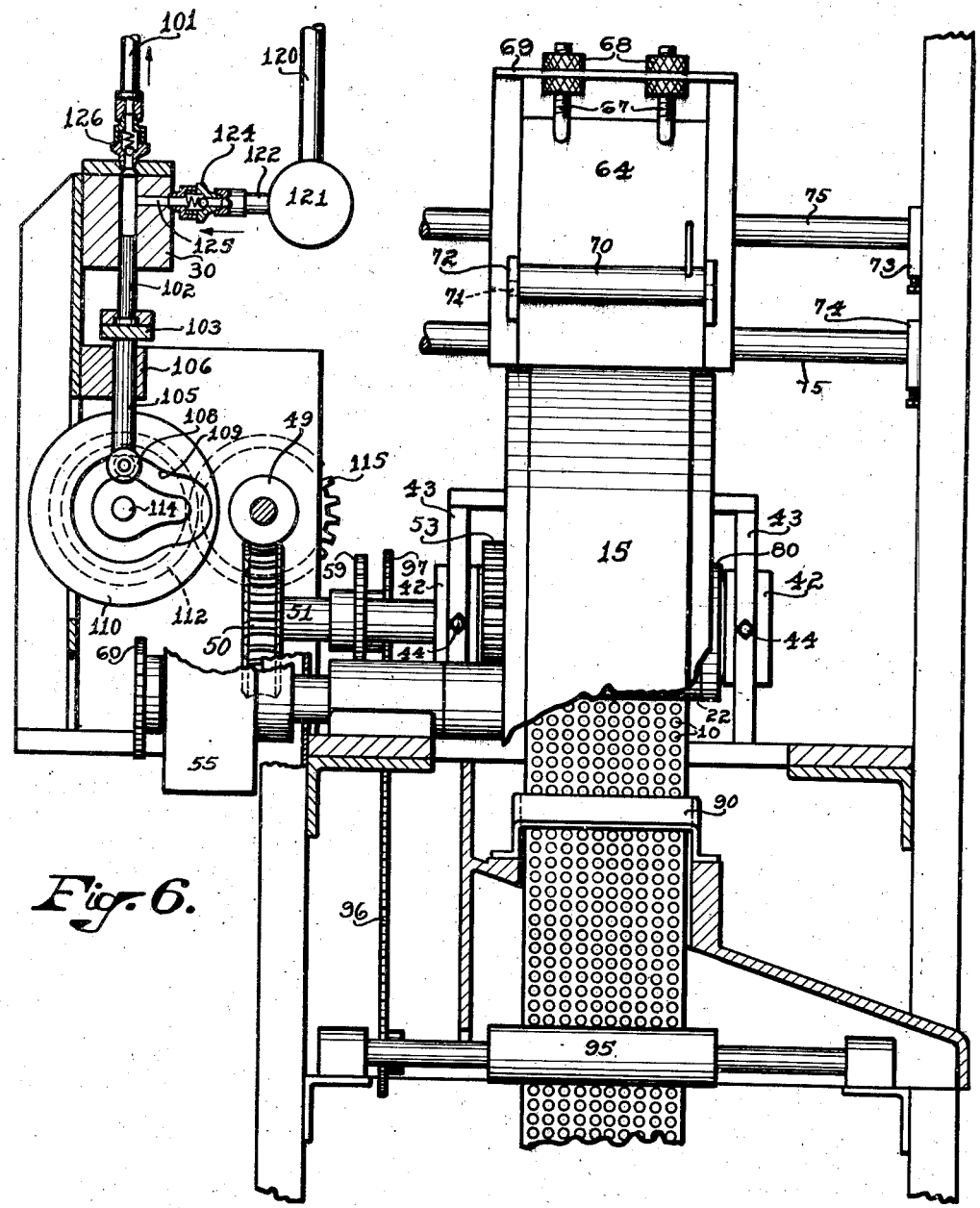

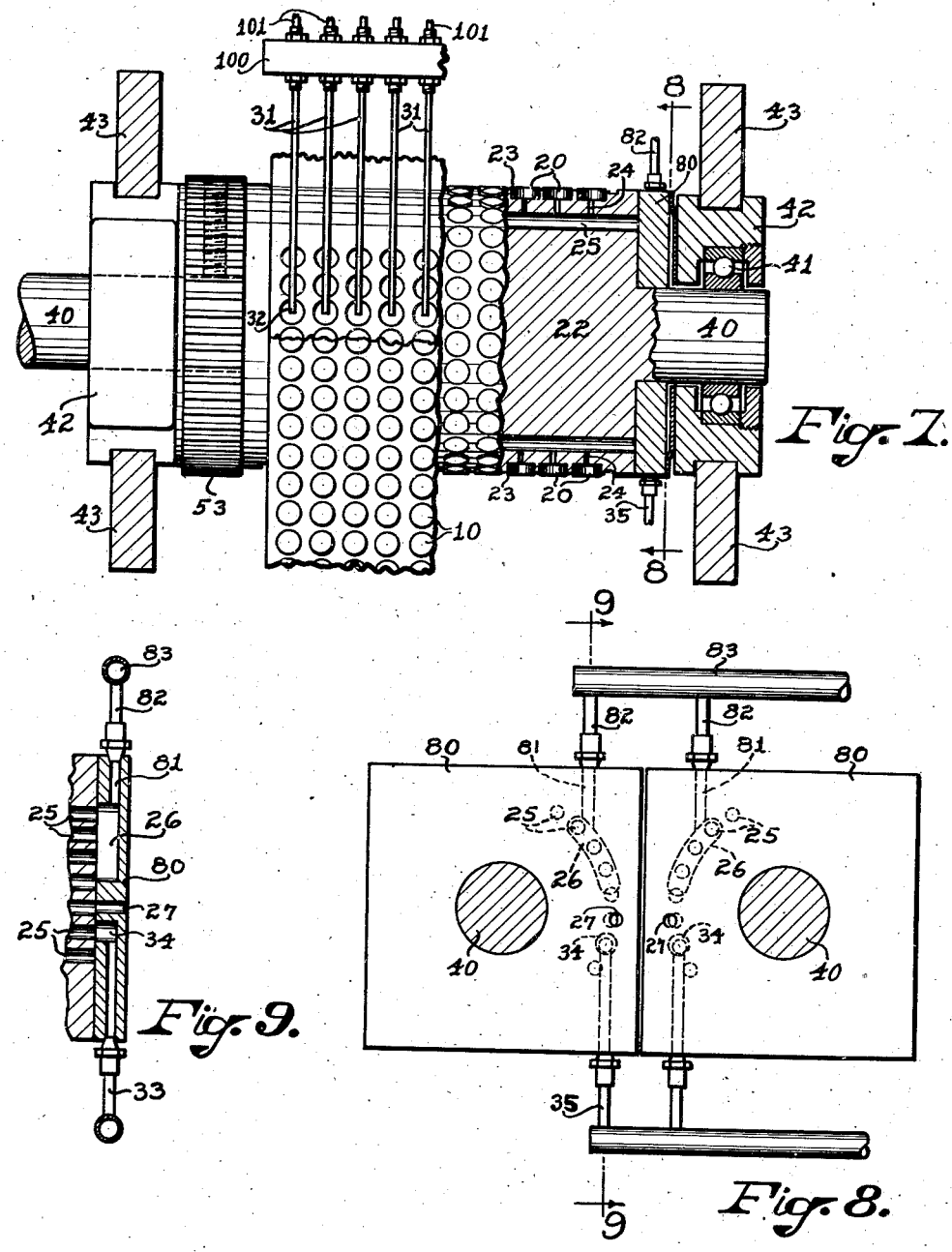

Patented Oct. 30, 1945

2,387,747

UNITED STATES PATENT OFFICE 2,387,747

MACHINE FOR AND A METHOD OF MAKING FILLED CAPSULES

Benjamin C. Cowley, Shrewsbury, Mass.

Application March 4, 1944, Serial No. 525,108

20 Claims. (Cl. 18—21)

This invention relates to a machine for and a method of making fluid-filled capsules, and more particularly to the production of a capsule from a plastic film and filling and sealing the same.

One type of apparatus heretofore made for this purpose comprises two opposed rotatable die rolls having a multiplicity of successively registering die cavities surrounded by sealing and severing ledges over and between which two strips of gelatin film are fed. A fluid medicament is forced under pressure against these juxtaposed gelatin films, and the fluid pressure molds the film to form a series of hemispherical shells conforming with the shapes of the mold cavities. Thereafter, the die ledges force the contiguous portions of the gelatin shells into sealing contact and so form a closed capsule around the fluid filling. This construction involves certain inherent problems, such as the tendency for the film to become unduly thin at the bottom within the die cavity, because the fluid pressure hinders the free movement of the film over the ledges and so limits the supply of additional film substance available for forming the shell. Also, the leading edge of the capsule which is first sealed has to withstand the full pressure of this film stretching operation, although it is still soft and pliable, and there is a danger of rupture under this stress, as well as improper stretching of the film under the frictional forces imposed. Moreover, there is a loss of medicament which is forced laterally along the die surface.

It has furthermore been proposed to preform the two halves of the capsule before the medicament is introduced. One scheme for filling the capsule parts has involved submerging the rotary dies and the associated parts in a body of the medicament. Another scheme has involved holding a pool of the medicament on the films between the die rolls by means of suitable sealing walls at the ends of the space between the die rolls. These, however, require the difficult operation of sealing the edges of the capsule parts while thus submerged; and this can be accomplished only under a delicate control of the temperature and other conditions of the film. Since the roll dies and other moving parts are filled with the medicament, any attempt at preforming the capsule halves by vacuum would cause the medicament to escape through the vacuum system and create various problems. Moreover, the capsules must float through the medicament, and this necessitates the sometimes difficult or impossible procedure of cleaning their surfaces. Such a procedure involves the use of a large quantity of medicament, which of course does not lend itself to the production of capsules where only a small amount of expensive material is to be employed or where cleanliness and the prevention of contamination of the product is imperative. Also, it is difficult to make a capsule of uniform size or to provide a uniform filler content, since the gelatin under such conditions varies in plasticity and will not stretch evenly and give a uniform thickness of wall material. There is, moreover, a material waste of the medicament that is sealed between the film strips in the areas between the capsule shells. These and other mechanical problems have made wholly impractical any machine of the type wherein the film and the capsule shell must be submerged in the medicament.

It is the primary object of my invention to overcome such problems and to provide a capsulating machine which will premake a capsule of required dimensions and content and which will fill the same uniformly and completely with a predetermined and measured charge of fluid.

A further object of this invention is to provide a method of capsulating fluid material which will produce capsules of uniform size filled with predetermined and uniform charges.

Further objects of the invention are to provide special constructional features whereby various types of plastic film material may be progressively and continuously cast as film and formed into capsules at coordinated rates; whereby a capsule of predetermined dimensions may be made and its shape and size so controlled that it will exactly contain a predetermined fluid content; whereby each of a series of capsules made simultaneously may be filled by separately actuated fluid pressure mechanisms; and whereby capsules of the same volume and weight may be made progressively and continuously. Other objects will be apparent or pointed out in the accompanying description of the invention.

In accordance with the preferred principles and embodiment of my invention, two continuous strips of plastic film, such as a soluble gelatin, are initially preformed to provide two series of shells or capsule parts, which are serially brought into juxtaposition and progressively sealed together. During the stage of sealing the premade shells, a predetermined and uniform quantity of fluid is injected into the cavity between the opposed shells, and the filling operation is completed only immediately prior to the completion of the sealing step, so that the capsule is entirely filled and the air is driven therefrom.

In my preferred procedure, two strips of gelatin film are each formed continuously on a casting drum. The films are heated to a proper temperature to develop the required plasticity and moldability. Thereafter, the gelatin films are each passed over and between two rotatable die rolls having peripheral mold cavities surrounded by sealing and severing ledges. As each film passes over a mold cavity, suction pressure is applied to draw the film down locally into the cavity and mold it as a shell of hemispherical or other suitable shape. The shape and size of the shell depends upon the degree of the vacuum pressure as well as the nature and condition of the plastic film. Immediately after the formation of the capsule shell, the two parts are brought into juxtaposition and their edges are continuously sealed by the plastic flow of material caused by the progressively contacting ledges of the rotating die rolls. Prior to the completion of the sealing operation, a measured charge of fluid is forced into the interior of the partly sealed capsule by means of a thin walled and very small tube connected with a constant volume pump. The location of this tube and the timing of the pumping operation are such that the tube begins to discharge the fluid when the capsule is substantially half sealed, and the entire charge of fluid has been introduced just at the moment when the capsule is drawn away from the end of the tube and is finally sealed. The vacuum is preferably maintained during the sealing operation, so as to hold the capsule in shape and position. Just after the fluid charge has been introduced and while the capsule is still open, the vacuum is then broken. This allows the springiness or elasticity of the gelatin or film material to contract the capsule slightly and so force the last bit of air therefrom, and thus cause the liquid to completely fill the capsule body. The final pressure of the sealing operation further insures the discharge of all the air from the interior of the cavity. As the die ledges progress in sealing the capsule, they cut the completed body from the film, and suitable mechanism, which may include means for discharging a jet of compressed air against the capsule, serves to remove the same from adhesion to the walls of the mold cavity. Thereafter, the capsules are removed from the film netting formed by the remainder of the two plastic strips.

Referring to the drawings which illustrate the method of this invention and a preferred form of machine for making filled capsules:

Fig. 1 is a diagrammatic view of suitable mechanism for carrying out the procedure of this invention;

Fig. 2 is an enlarged fragmentary sectional view showing the locations of the opposed die molds and fluid filling tube at the moment when the capsule is substantially filled and the sealing operation is about to be completed;

Fig. 3 is a top plan view of the capsule taken on the line 3—3 of Fig. 2;

Fig. 6 is an enlarged end elevation of the machine, with parts broken away and in section so as to show in particular the operation of the fluid pumping mechanism;

Fig. 7 is a side elevation partly broken away of a die roll and associated filling tubes and gelatin strip;

Fig. 8 is an elevational view of the two valve plates taken substantially on the line 8—8 of Fig. 7; and Fig. 9 is a sectional detail on the line 9—9 of Fig. 8.

Figure 4:
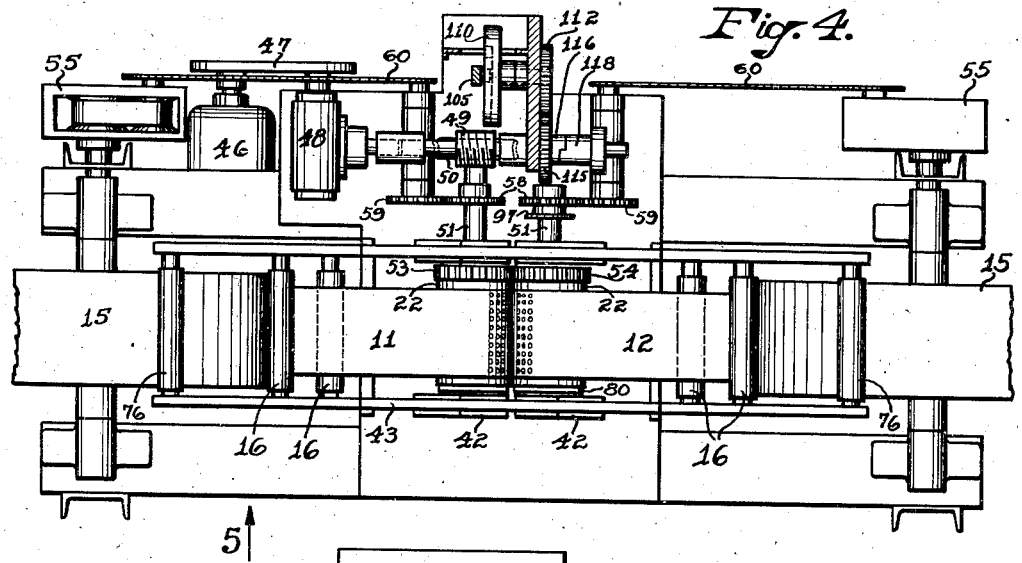
Fig. 4 is a top plan view taken substantially on the line 4—4 of Fig. 5 and with some parts removed for clarity of illustration.

The principles and the methods of the invention are illustrated diagrammatically in Fig. 1 of the drawings. As there illustrated, a capsule 10 made of a plastic material, such as soluble gelatin, may be made from two continuous strips of gelatin film 11 and 12. Each of these film strips may be made continuously by flowing a stream of melted gelatin from a heated container 14 onto the peripheral surface of a rotating casting drum 15. The solidified film is stripped continuously from the drum and passed over one or more guide and oiling rolls 16, thence beneath a heater 17 which may be suitably heated, such as by hot water, steam, or preferably electric heating coils 18. This heater is thermostatically controlled to impart a required temperature condition to the film and give it that plasticity which will permit it to be readily shaped to form a capsule shell of concave, hemispherical or other suitable shape.

In order to mold each plastic film strip and form a series of capsule shells, I preferably utilize the suction effect of a vacuum applied to the under side of the film as it passes over a mold cavity, whereby the plastic film is drawn into that cavity to an extent determined by the shape of the cavity, the moldability of the film and the degree of vacuum applied. As later more fully described, a series of mold cavities 20 may be formed on the peripheries of two die rolls 22. These cavities are surrounded by outwardly projecting die ledges 23, and the rolls are so located in axial parallelism that the mold cavities revolve into juxtaposition with the ledges in rolling contact, so that the two films passing therebetween are subjected to a plastic flow sealing operation and the capsules 10 thus formed are cut from the films by the die ledges. As each mold 20 reaches the position A of Fig. 1, the air therebeneath is withdrawn from the mold chamber through a passage 24 into a pipe 25 communicating through a valve passage 26 with a pipe line 82 suitably connected to the vacuum pump 28. The gelatin or other film material which lies on and in sealing contact with the die ledge 23 is drawn inwardly into the mold chamber to an extent depending upon the vacuum pressure applied and/or the plasticity of the film material. That is, the film is drawn inwardly to form a concave shell, which may or may not touch the bottom of the cavity. As shown, the cavity is preferably of such a depth that the limiting shape of the shell is substantially hemispherical. The mold cavity may, however, be made much deeper to form elongated capsules, or to permit a fuller control of the shell shape and size and particularly when the film material is not to be stretched far enough to touch the bottom of the cavity. The vacuum is maintained beneath this concave shell as it passes downwardly with the rotating die roll 22 and thus holds the shell in a substantially rigid condition and fixed size.

The two series of shells carried on the rolls 22 gradually approach each other until the lower portions of two opposed shells, which are still parts of the continuous gelatin strips 11 and 12, come into contact at position B. At this point, each ledge 23 of the mold 20 squeezes the film substance laterally and into sealing contact with the shell of the opposed film. Ultimately, the projecting ledges come into rolling contact and thus progressively shear the sealed capsule from the associated film strips. The two shell parts are sealed progressively from the bottom or leading edge of each die ledge as the parts rotate downwardly, and the sealing and severing is accomplished as the ledges pass the center line connecting the two axes of the rotary die rolls. The film material adjacent the following edge of each ledge becomes the leading material for sealing the capsule halves of the next two shells in the series.

In order to introduce into the capsule shells a fluid, such as a liquid medicament, a paste, powder or other suitable filling material, I provide an intermittently actuated pump 30 arranged for periodically forcing a fluid charge through a pipe 31 which has its lower end 32 slender and thin walled and terminating in a narrowed and elliptically shaped orifice, as shown in Fig. 3. The size and location of the end 32 of the pipe is such that it projects into the capsule cavity and almost to the sealing position of the leading edge of the ledge 23 in position B. The pipe end remains within the moving shell up to the moment, as shown in Figs. 2 and 3, just prior to that at which the sealing operation is finally completed at the top of the capsule by the following edge of the die ledge 23. It is preferred that the pump and associated parts be so operated and arranged that the fluid will start flowing into the capsule at about the time when the lower halves of the two shells have been sealed, and the rate of flow is such that a measured and predetermined quantity of the fluid is completely introduced just prior to the final stage of the sealing operation.

It is preferred to release the vacuum just prior to the time when the final sealing is being accomplished, so that the slight springiness or elasticity of the gelatin film will cause the capsule to shrink slightly and eject the last bit of air from the cavity. This may be accomplished by causing the open end of the pipe 25 to pass across and communicate with a hole 27 which is open to the outside atmosphere. The capsules that stick to the mold sides may be ejected by means of a force pump 33 which is periodically connected through a suitable pipe line 35 and a lateral passage 34 with the passage 25 at a time when the two opposing molds 20 start to recede from one another. This pump ejects a blast of compressed air against the capsule and thus frees it from the mold sides and causes it to travel downwardly with the film netting to a point where the capsule may be removed laterally from the hole in the netting.

Figure 5:
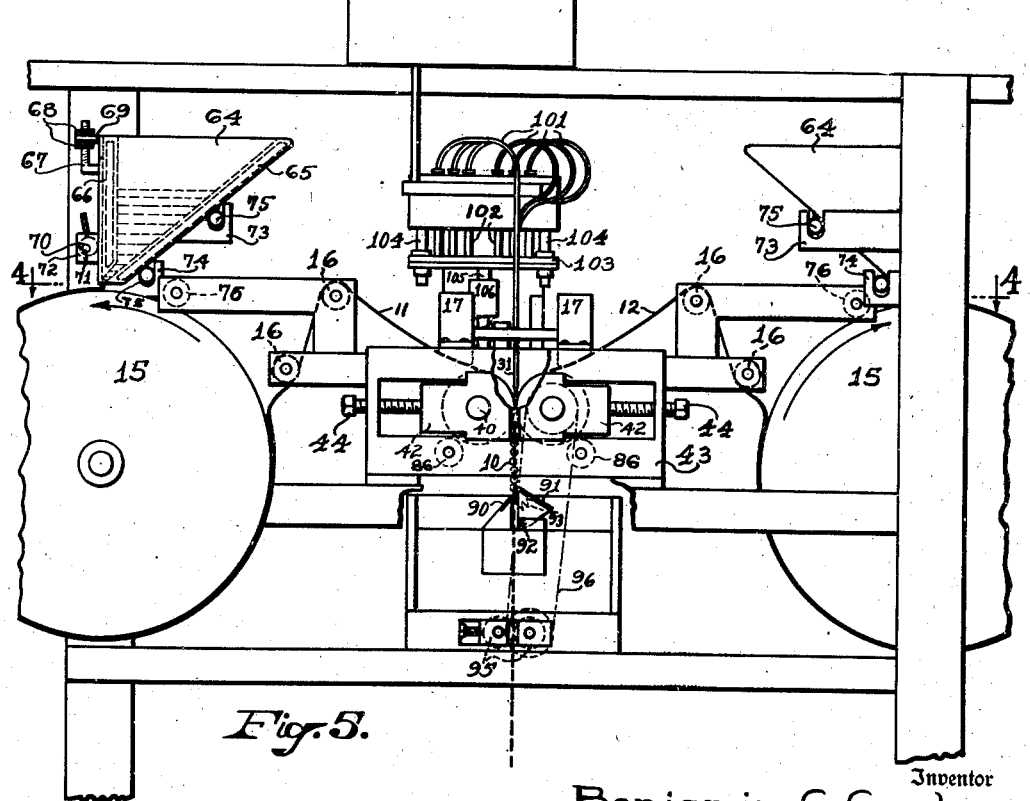
Fig. 5 is a side elevation of the machine looking in the direction of the arrow 5 of Fig. 4.

An apparatus embodying these various principles and method is shown in the remaining figures of the drawings. As shown particularly in Fig. 7, a multiplicity of molds 20 may be arranged in several rows about the periphery of each die roll 22. The roll may be a substantially solid metal body having a journal 40 at each end thereof suitably mounted in ball or roller bearings 41 which are carried in slides 42 suitably mounted for movement toward and from each other within the slide way provided by the rectangular frame structure 43 (Fig. 5). Adjusting screws 44 carried by the frame and slides serve to position the die rolls accurately relatively to each other so that the die ledges may revolve in rolling contact.

The die rolls are positively rotated in the directions of the arrows in Fig. 1 by suitable mechanism shown in Figs. 4 and 6. This may comprise an electric motor 46 mounted on the framework of the machine which is connected by a belt 47 to drive a suitable speed reduction mechanism 48 of standard construction. The latter is connected through a coupling with a worm 49 which drives the worm gear 50 mounted on the shaft 51 formed as an extension of the journal 40 of one of the die rolls 22. A gear 53 adjustably fixed on the journal 40 by a set screw (Fig. 7) meshes with a further gear 54 of the same size on the journal of the other die roll 22 and thus drives the latter (Fig. 4). The rate of operation of these equal sized die rolls depends upon the requirements of the process; but it is found satisfactory to rotate die rolls 5 inches in diameter at a rate of about 1.5 R. P. M.

The casting drum 15 may be a large hollow metal body having a smooth peripheral surface of the required width or at least as wide as the effective length of each die roll. The drum may be held at a proper temperature by suitable means, such as by supplying it with cooling water or by leaving the ends of the drum open so that it will be cooled by the outside atmosphere. This drum is driven at the required rate for making the film and preferably by means of a speed change mechanism. It is desirable, in carrying out this process, to vary the rate of rotation of the die rolls and the casting drums relative to each other, so as to provide for variations in the film composition. That is, I may use various compositions of gelatin or other suitable plastic film material and regulate the speed of the casting drum relative to that of the die roll so as to take up for variations in stretching or elasticity of the film. For example, if a gelatin that is not hydrolyzed materially is used, the periphery of the casting drum may be driven at substantially the peripheral rate of the die roll; but where the gelatin has become greatly hydrolyzed, it is found that as the number of hydroxyl groups in the gelatin increases, there is an increasing tendency for the gelatin to sag and stretch as it is pulled off the casting drum and carried to the die rolls. Hence, by slowing down the casting drum, I am able to compensate for this stretching of the film material. For this purpose I may use any suitable speed change mechanism, such as a Reeves variable speed drive 55 (Fig. 4) comprising two belt driven V pulleys, each of which is made of two relatively movable halves arranged to vary the effective radius of the pulley. The Reeves drive may be of suitable construction, such as is shown in the U. S. patent to Reeves, #2,188,253 of January 23, 1940. As shown in Fig. 4, a sprocket 58 on each extension shaft 51 meshes with a sprocket 59 on a cross shaft suitably mounted on the machine framework and a further sprocket at the other end of that shaft connects through a chain drive 60 with the variable speed mechanism. Each drum 15 is similarly driven from its associated die roll. That is, the die rolls 22 are driven directly by the motor 46 at a constant speed, and gears on their shafts drive the Reeves variable speed mechanism. The relative speeds of the drums 15 and the associated die rolls may be varied by suitable adjustments of the Reeves cone pulleys. For example, if the two opposed cones or halves of the left hand pulley, at the left side of Fig. 4, are moved further apart, this causes the V belt to ride lower or nearer the pulley axis and thus makes the effective diameter of the left hand pulley smaller relative to the right hand pulley of the drive. This causes the associated casting drum 15 to rotate faster relative to the die rolls 22. The speed of the right hand drum is similarly adjusted. Hence, the drums may be readily speeded up or slowed down relative to the rate at which the film is drawn between the die rolls so as to compensate for variations in the degree of stretch of the various batches of gelatin employed.

Various expedients may be adopted for making the film. In the construction shown particularly in Figs. 5 and 6, two reservoirs 64 for gelatin are so constructed and mounted that they will supply a thin stream of melted gelatin continuously to the top surface of each of the drums 15. The tank 64 may comprise hollow, water heated, stationary walls 65 and a vertically adjustable, water heated wall 66. The latter wall is supported by means of a screw threaded angle arm 67 projecting outwardly therefrom and in turn supported by means of adjusting nuts 68 engaging a flange 69 carried by a stationary wall of the tank. A manually rotated cam 70 is mounted on eccentric bearings 71 carried by bearing lugs 72 supported on the side walls of the tank. The adjusting screws 68 serve to raise and lower the vertical wall 66. Hence the position of the vertical wall relative to the stationary sloping wall 65 regulates the size of the orifice at the bottom of the tank and controls the rate of flow of the gelatin from the tank. As shown in Fig. 5, the tank may be removably mounted on the machine frame by means of two rocking supports 75 fixed to the wall 65 and removably carried in slots on two pairs of stationary bearing members 73 and 74. These supports permit ready removal of the tank for any required cleaning or filling operation. The tank is ordinarily located with its spout arranged quite close to the drum 15, so that the gelatin may flow in a smooth and quiet stream directly from the tank onto the casting surface of the drum. The gelatin quickly congeals as a film on the cool drum surface, and the film passes around and beneath the drum and thence over a series of guide rollers 16 which strip the film from the drum and lead it to the die rolls. Each roller 16 may be supplied with oil, if desired, so as to condition both sides of the film for the molding operation. A supplemental oil roller 76 may apply oil to the casting drum. The rollers 16 may be positively driven but are preferably loosely mounted, so that they turn readily under the frictions involved in passing the film thereover.

In order that each film 11 and 12 may have the right plasticity and elasticity for the molding operation, it is preferably passed beneath and close to or in contact with the smooth surface of the heater 17, which is preferably heated by thermostatically controlled electric resistance units 18 of suitable construction (Fig. 1). The heater 17 has an extensive area of contact with the film and will serve to increase the temperature of the film gradually. Immediately after passing beneath the heating element, each film contacts with its associated die roll. If desired, the die rolls may have their temperatures controlled by a suitable medium, such as water circulated within passages therein.

The molds illustrated are formed by drilling parallel rows of radial cavities in the die 22 and inserting steel die rings therein. The die rings project equally above the peripheral surface of the die roll, and their edges are ground by a grinding wheel so that they lie in a cylindrical surface, whereby the opposed ledges make a rolling contact. The two die rolls are adjusted to such positions that the ledges of two opposed rows of mold cavities are in exact rolling contact and the molds and ledges are centered relative to one another, so that the ledges form shearing members which progressively cut the capsule from the film as they pass the center line of the two die rolls. The operation of these die ledges 20 is such as to squeeze laterally the substance which forms the periphery of each shell pocket of each film and thus unite the two concave shells before the ledges contact and sever the capsule from the double film sheet.

The gelatin, when it reaches the die rolls, is in the form of a smooth film of a thickness which has been predetermined by the rate of flow from the orifice of the tank 64. The film has the required plasticity for molding as determined by its composition and temperature. The film lies over and seals the tops of the mold cavities. The number of the mold cavities on the die roll depends on the size of capsule to be made. When a given portion of the film reaches the position A (Fig. 1) it is drawn inwardly by means of suction and stretched to the required shape. To that end, as shown particularly in Figs. 7, 8 and 9, the bottom of each mold cavity in each row is connected by a radial passageway 24 with a passage 25 that has been drilled lengthwise of the die roll and parallel with the axis thereof. These passages 25 may open at one end only of the drum, where they may connect with a valved passage in the stationary valve plate 80. This plate has a central opening through which the journal 40 passes. The right hand end of the die roll and the side of the valve plate are accurately machined to provide smooth and plane surfaces which make a sliding and sealing contact. Each valve plate has an arcaute passage 26 therein which is connected by a drilled passage 81 with a pipe line 82 connected through a header 83 with a suitable pump arranged for withdrawing air and providing a required and regulatable degree of vacuum. The vacuum may be controlled by a reducing valve or by employing a variable pressure pump. The arcuate passage 26 opens through the side of the valve plate 80 and is shaped to communicate successively with each passage 25 as the die roll revolves. The vacuum is applied to the space within each mold 20, while the mold is travelling between the positions A and B of Fig. 1. Thus, when the film 11 or 12 reaches a position where the vacuum is applied therebeneath, the film is drawn downwardly into the mold cup 20 to an extent depending upon the degree of vacuum pressure.

The depth of the mold cavity is shown as equal to the radius of the die ring so that the shell will be hemispherical when the film has been drawn down to contact with the bottom of the mold. The mold cavity may be shallower or deeper. The film may be drawn down until it contacts with the upper end of the passage 24 and there seals the mold pocket from further exhaustion of the air therein. But if desired, the pressure may be less and the film not drawn into contact with the mold bottom. Thus the size of the capsule may be regulated in accordance with the temperature and plasticity of the film by varying or controlling the vacuum pressure.

The arcuate slot 26 is preferably of such length that it is maintained in contact with each of four passages 25 (Figs. 1 and 8) while the capsule shell is passing downwardly to a point where the two opposed shells in position B have had their edges almost completely sealed. A further hole 27 is drilled longitudinally through the valve plate 80, and it opens at its outer end to the atmosphere. This is so positioned that after a given passage 25 has broken contact with the arcuate vacuum slot 26, it very soon contacts with that open passage 27 and thus permits air to enter the mold cavity and break the vacuum. A further passage 34 in the valve plate 80 connects as above explained, through a pipe line with an air pressure pump 33. Thus, when a given passage 25 opens to this passage 34 a charge of air under pressure is forced abruptly into the mold cavity and serves to dislodge the capsule from the mold cavity if it tends to stick therein. I may also use instead of or in conjunction with the air pressure pump a pair of rotary brushes 86 suitably driven in a direction opposed to that of the associated die roll, and each brush is arranged to sweep over the surface of the roll and dislodge any capsule remaining in the mold cavity.

The perforated film netting, which remains after the capsules have been severed therefrom but which still carries capsules loosely supported therein, passes downwardly (Figs. 5 and 6) to a point where the capsules are stripped from the netting and forced laterally therefrom. This stripping device may comprise two V shaped members 90 and 91 having their apexes projecting upwardly and arranged closely on each side of the film. The member 90 is fixed in position. The stripper 91 is pivotally mounted on a pivot 92 and urged into its vertical position by means of a spring 93. The film is drawn between these two stripping members by two positively driven rollers 95 suitably mounted in the base of the machine. The rollers are driven by a sprocket and chain 96 from a sprocket 97 carried on the shaft 51 (Figs. 4 and 6). Thus the film is drawn positively downwardly and as the capsules in the perforated netting strike the strippers 90 and 91 they are forced laterally from the netting and are suitably caught in a receptacle at the base of the machine.

A primary feature of this invention involves forcing a measured, pre-determined quantity of liquid, paste or powder or other suitable fluid material into each capsule just prior to the time when its sealing has been completed. To this end, I provide a set of filling pipes 31 having their nozzles 32, above described, arranged to introduce liquid simultaneously into each of the capsules in a given horizontal row. As shown in Fig. 7, each pipe 31 is carried by a supporting plate 100 suitably mounted on the framework of the machine. It is required that these pipes be rigidly and accurately supported. Each pipe 31 connects removably and individually with a further pipe 101, and each of the latter is individually connected to a separate pump 30. Each pump 30 (Figs. 5 and 6) has a reciprocable plunger 102 connected at its lower end with a reciprocable plate 103 suitably guided by guide rods 104 for vertical movement. The plate 103 is connected to slide rod 105 suitably guided by a block 106. The rod 105 carries at its lower end a roller 108 which rides in the cam slot 109 on the side of a rotary cam plate 110. This cam plate is driven by a gear 112 (Fig. 4) on the other end of its supporting shaft 114. The gear 112 meshes with a further gear 115 on a sleeve 116 loosely carried by the shaft 50. This sleeve is adapted to be connected to the drive shaft 50 by means of a manually slidable clutch member 118 which is slidably keyed to the shaft. Thus, the pump may be brought into operation after the capsule making and sealing has been started. The pump is timed to operate through one stroke while each row of capsules is passing through position B.

A pipe 120 (Fig. 6) serves to introduce medicament or other fluid from a suitable supply reservoir to a further reservoir 121 which is connected through a pipe 122 and a check valve 124 with a lateral passage 125 in the pump. A further check valve 126 is located in the outlet pipe line 101. The pump chamber is a cylindrical hole within which the pump piston fits. The pump and valve parts are so arranged that when the pump piston 102 moves downwardly it draws fluid from the reservoir 121, and when the piston moves upwardly it forces a predetermined or measured charge of the fluid through the pipe 101 to the filling nozzle 32. It will be noted that the cam slot 109 has an abrupt rise, and it is so arranged that the pump discharges its fluid during about a quarter turn of the cam plate. The remainder of the cam slot is circular and does not move the pump piston. In other words, the fluid is forced into the capsule quite rapidly and at a time which is accurately predetermined relative to the sealing of the capsule walls. This is during that period from the time when the capsule has been partially sealed until the capsule is nearly fully sealed, as indicated in Fig. 3. The filling operation is completed at that time when the capsule has moved far enough downwardly to withdraw the pipe nozzle 32 therefrom. The coordination and timing of the pump with the capsule movement is therefore of primary importance. The small orifice of the pipe 31 holds the pipe full and free from air. Hence, as indicated by the horizontal lines 130 in Fig. 1, each stroke of the pump moves an exact and uniform amount of liquid through the pipe. For making a capsule of ⅜" diameter, the filler pipe for each pair of shells may be located at about $\frac{3}{32}$" from the center line of the die rolls. The closer the nozzle can be brought to the final sealing position, the more surely will the filling operation proceed satisfactorily.

The operation of the machine and the various steps of the method involved in capsulating a fluid material have been fully set forth above. Gelatin is a substance that is difficult to handle, since it tends to case-harden on any side which is exposed to air and particularly on the exposed side of the film on the casting drum. It is, therefore, desirable to so arrange the parts that the capsule edges which are sealed have been exposed as little as possible to that case-hardening step. Hence, the casting drum 15 and the die rolls are brought as close together as is feasible, although they are shown at a considerable distance in the drawings for the sake of clarity of illustration. The heater 17 is located above the film, or on that side which is to be sealed. The gelatin may be preheated on the casting drum and thus conditioned for molding before it enters the sealing zone. It is preferred to employ heater 17 and to locate it as close as possible to the sealing stage; and since the pipes 31 are small, the heater may be located immediately above the die rolls, or close to the position A where the capsule shell is molded. At 85° F. the gelatin will not stretch satisfactorily, while at 150° F. it may stretch too much, and thus require a proper speed control of the casting drum relative to the die roll. The condition of the gelatin may, therefore, be readily controlled by varying the heat and the speed of casting; also the condition of the gelatin may be controlled by varying its composition as regards its hydrolyzed content. If the gelatin comprises a large percentage of hydrolyzed material, then the heating elements 18 may be brought to a lower temperature to get the same degree of stretch in the film as would be had with a less hydrolyzed gelatin. It may also be noted that the gelatin strips may be cast on a single drum and the two films led to the die rolls.

It will, also, be appreciated that the gelatin is not made to conform to the shape of the inner walls of the mold cavity, but that the capsule shell is stretched substantially uniformly to a concave shape such as a hemisphere. Hence the shell does not touch the mold except at the upper portion of the shell and the shell wall is not damaged materially. The depth of the shell cavity is limited by the depth of the mold cavity. When the gelatin shell reaches and closes the open end of the passage 24, then the vacuum is sealed therefrom and the shell can not be distorted in shape. Since the film is free to move, the suction effect causes gelatin to be drawn from the portion of the film that lies between adjacent mold cavities. Hence the shell is not stretched unduly or damaged, as might happen if the medicament were introduced under pressure and required to shape the shell. In that case the film material would be held immovable.

It is often desirable to vary the capsule content, and instead of regulating the thickness of the gelatin film for this purpose it is now feasible, in accordance with my process, to vary the vacuum pressure and thus draw the gelatin capsule inwardly to a greater or lesser extent and thereby control the volume capacity of the completed capsule.

Various features of this invention may be employed with capsule making machines of other types or of modified constructions. For example, it is feasible to preshape only one film and form capsule shells on one die roll only and thus leave the other film in its original unmolded shape for sealing the shells of the molded film. In this case, the filling fluid may be injected into the hollow capsule shell at a time just prior to the final stage of sealing. Also, in such a machine the roll carrying the unmolded film may be arranged above the die roll carrying the shell formed film. Likewise, the capsule shells may be molded to different shapes, such as where one shell is a deep body and the other forms a shallow cover therefor.

It will now be appreciated that various modifications may be made in the construction of the machine to embody the principles of my invention and that various stages of the process may be carried out by different types of mechanisms or manually, as desired. Hence, the above description is to be interpreted as defining the process and the principles of my invention and not as limitations on the claims appended hereto.

I claim:

1. A capsulating machine comprising means for initially preforming two empty capsule shells from moldable plastic film, means for progressively sealing juxtaposed walls of the two shells and forming a capsule therefrom, and means actuated during the sealing operation for injecting a predetermined amount of fluid to the preformed capsule just prior to the completion of the final sealing thereof.

2. A capsulating machine comprising means for supplying moldable plastic film, means for initially molding empty hollow shells therefrom, means for positioning the preformed shells in juxtaposition and progressively sealing them together to form a capsule and means actuated after the preformed capsule has been partially sealed for injecting into the capsule a predetermined amount of fluid and completing the filling of the capsule just prior to the final sealing thereof.

3. A capsulating machine comprising means for providing moldable plastic film, means for shaping initially therefrom two empty capsule shells, means for progressively sealing juxtaposed walls of the shells and forming a completed capsule, and fluid pressure mechanism actuated during the sealing operation for injecting a predetermined amount of fluid into the partially sealed preformed capsule and substantially filling the same just prior to the final sealing thereof.

4. A capsulating machine comprising two axially parallel, rotatable die rolls having a series of mold cavities surrounded by die ledges, means for passing a plastic film progressively over each roll and then between the rolls, means associated with each die roll for progressively shaping each film and preforming a series of empty capsule shells within the mold cavities, said ledges being arranged for rolling contact to seal opposed shells and sever them from the film progressively, a filler pipe projecting into the space between each pair of shells being sealed and means associated with each pipe which injects a predetermined quantity of fluid into the preformed partially sealed shells and fills the capsule just immediately prior to the final sealing thereof.

5. A capsulating machine comprising two rotatable die rolls having a series of opposed mold cavities surrounded by die ledges which make a rolling, sealing and severing contact, means for passing a plastic moldable film over each die roll and thence between the rolls, means for exhausting air from a mold cavity beneath a localized area of film supported on said ledge and thereby preshaping an empty capsule shell prior to the sealing stage, said ledges being arranged to bring opposed, preformed shells progressively into sealing and severing contact and form a capsule therefrom, and means actuated after the beginning of the sealing operation for injecting a predetermined amount of fluid into the partially sealed empty capsule and substantially filling the capsule prior to the final sealing thereof.

6. A capsulating machine comprising two movable die members having opposed cavities surrounded by sealing and severing ledges, means for exhausting air from each mold cavity beneath a moldable plastic film supported on the associated ledge and preshaping an empty shell from the film, means for bringing the ledges into sealing and severing contact to form a capsule by plastic flow of the preformed film shells, and means for injecting a predetermined charge of fluid into the preformed empty capsule during and prior to the final sealing thereof, said air exhausting means serving to maintain a reduced air pressure beneath each shell during the major portion of the sealing operation.

7. A capsulating machine comprising two movable die members having opposed cavities surrounded by sealing and severing ledges, means for exhausting air from each mold cavity beneath a moldable plastic film supported on the associated ledge and preshaping an empty shell from the film, means for bringing the ledges into sealing and severing contact to form a capsule by plastic flow of the preformed film shells, fluid pressure mechanism actuated during the sealing operation for injecting a predetermined amount of fluid into the preformed, partially sealed, empty capsule and substantially filling the capsule just prior to the final sealing thereof, said air exhausting means serving to maintain a reduced air pressure beneath each shell during the major portion of the sealing operation.

8. A capsulating machine comprising a die mold having a mold cavity surrounded by a sealing ledge, means for exhausting air from the mold cavity and premolding an empty shell from a plastic film supported on said ledge, an opposed die member having a second sealing ledge arranged to hold a second film in sealing contact with said shell, means for relatively moving the die ledges to seal the shell and second film and form a capsule, means for injecting a predetermined quantity of material into the preformed empty capsule prior to final sealing thereof and means for admitting air to the mold cavity after the sealing operation has been nearly completed.

9. A capsulating machine comprising mechanism for supplying two strips of moldable plastic material, two horizontal rotatable die rolls having linear series of progressively juxtaposed mold cavities surrounded by die ledges which make a rolling contact, means for passing each film over a die roll and then downwardly between the die rolls, means for creating a partial vacuum within each mold cavity in a series and beneath the localized area of film resting on the surrounding die ledge and thereby molding an empty shell, said die ledges thereafter progressively sealing the pair of opposed shells in a horizontal series and severing from the films the capsules thus formed, a series of nozzles having their orifices depending between the shells while they are being progressively sealed and which just clear the shells as the latter come together at their tops at the completion of the sealing operation, and pump mechanism for injecting through each nozzle a predetermined quantity of a fluid, said pump being timed to fill the capsule just prior to its being finally sealed.

10. A capsulating machine comprising a pair of horizontal die rolls provided with a plurality of corresponding mold cavities in their peripheral faces, each cavity being surrounded by an annular sealing and cutting ledge so shaped and arranged that opposed ledges make a rolling, sealing and cutting contact, means for passing a film of moldable plastic material over each die roll and then downwardly between the rolls, means for exhausting air from the mold cavity beneath a localized area of the film supported on an associated die ledge and molding an empty capsule shell therefrom, said ledges thereafter progressively sealing the peripheries of opposed shells and forming a capsule, an injection nozzle having its orifice located in the space between two opposed mold cavities and just clearing the upper portions of the contacting ledges, means for injecting a predetermined quantity of fluid through said nozzle and filling the capsule just prior to the completion of the sealing thereof, and means for maintaining a reduced air pressure beneath the shells and holding them immovable during the major portion of the sealing operation.

11. A capsulating machine comprising a rotatable casting drum, means for supplying molten plastic film material to the periphery of the drum and continuously forming a strip of film thereon, a pair of rotatable die rolls having opposed mold cavities surrounded by die ledges which make a rolling, sealing and severing contact, means for leading the film from the drum over one die roll and thence between the rolls, means associated with said die roll for making a hollow empty shell from the film, means for leading another film over the second die roll and into sealing contact with said shell, said ledges revolving in the same direction and progressively sealing the film parts and forming a completed capsule, means for filling the empty capsule with liquid prior to the final sealing thereof, and speed change mechanism for rotating the drum and the die rolls at relatively variable speeds so as to compensate for any stretching of the film material passing from the casting drum to the associated die roll.

12. A capsulating machine comprising two rotatable casting drums, means for supplying molten plastic film material to the periphery of each drum and continuously forming a strip of film thereon, a pair of rotatable die rolls having opposed mold cavities surrounded by die ledges which make a rolling, sealing and severing contact, means for leading the film from each drum over an associated die roll and thence between the rolls, means associated with the die rolls for forming capsule shells from said films, said ledges revolving in the same direction and progressively sealing opposed shells and forming a completed capsule, means for filling each capsule with liquid, two separate speed change mechanisms for rotating each drum and its associated die roll at relatively variable speeds, and means for rotating the die rolls at the same peripheral rates.

13. A capsulating machine comprising two rotatable die rolls having opposed mold cavities surrounded by die ledges which make a rolling, sealing and severing contact, means for continuously forming two films of moldable plastic material and leading the same over the die rolls and thence between the rolls, means including a controllable heater for heating each film to a predetermined temperature as it contacts with its associated die roll, means for exhausting air from the mold cavity beneath the localized area of film lying on each of two opposed mold ledges and thereby preshaping empty capsule shells, said ledges serving thereafter to seal juxtaposed shells and sever the formed capsule from the films, and means for injecting a predetermined quantity of fluid into the preformed empty capsule during and prior to the completion of the sealing operation.

14. A capsulating machine comprising two rotatable die rolls having opposed mold cavities surrounded by die ledges which make a rolling, sealing and severing contact, means for passing a plastic moldable film over each die roll and thence between the rolls, means for exhausting air from a mold cavity beneath a localized area of film supported on each of two opposed mold ledges and providing a controlled and predetermined subatmospheric pressure which forms empty concave shells of predetermined size, said ledges being arranged to bring opposed preformed shells progressively into sealing and severing contact and form therefrom a capsule having a predetermined and controlled volume content, and intermittently actuated mechanism which operates after the beginning of the sealing operation to inject a predetermined amount of fluid into the partially sealed empty capsule and substantially fill the same prior to the final sealing thereof, the capsule size being coordinated with the fluid content by controlling said pressure.

15. A capsulating machine comprising two rotatable die rolls having on their peripheries a plurality of longitudinal series of progressively juxtaposed mold cavities, each of which is surrounded by a die ledge, means for passing a plastic film over each roll and then between the rolls, means for exhausting air from each of the mold cavities as they reach predetermined positions and drawing inwardly a localized area of film supported on a ledge and thereby shaping an empty capsule shell, said ledges being arranged for thereafter sealing opposed shells and forming a capsule, a separate filler pipe projecting into the space between each pair of opposed shells being sealed, a separate constant volume pump connected with each filler pipe and mechanism operating in timed relation with the rotating die rolls which intermittently actuates each pump and forces a predetermined quantity of fluid into each empty capsule during and prior to the completion of the sealing operation.

16. A capsulating machine comprising two movable die members having opposed cavities surrounded by sealing and severing ledges, means for exhausting air from each mold cavity beneath a moldable plastic film supported on the associated ledge and shaping an empty shell from the film, means for bringing the ledges into sealing and severing contact to form a capsule by plastic flow of the preformed film shells, means whereby a predetermined charge of fluid is injected into the empty capsule during and prior to the final sealing thereof, said air exhausting means serving to maintain a reduced air pressure beneath each shell during the major portion of the sealing operation, and means for introducing air into the mold cavity just prior to the final sealing of the capsule so that elasticity of the capsule shell will expel residual air therein.

17. The method of making a filled capsule comprising the steps of applying suction to localized areas of two moldable plastic films and preforming empty capsule shells, juxtaposing a pair of said empty film shells and progressively forcing them into sealing contact to form a capsule, and injecting a measured quantity of fluid into the preformed empty capsule only after its edges have been partially sealed and completing the injection of the fluid just prior to the final sealing operation.

18. The method of capsulating a measured quantity of fluid comprising the steps of applying a predetermined, subatmospheric pressure to a localized area on one side of each of two films and drawing the film inwardly to an extent determined by said pressure and thereby molding an empty capsule shell, subsequently juxtaposing two shells and progressively sealing them to form a capsule, forcing a predetermined quantity of fluid into each empty capsule prior to the sealing thereof, and controlling the subatmospheric pressure so that the internal capsule volume substantially equals the fluid content and the capsule is filled.

19. A capsulating machine comprising film molding apparatus, a pair of die rolls having opposed mold cavities surrounded by die ledges which make a rolling, sealing and severing contact, means for leading a strip of film from said apparatus over each roll past a molding position to a filling and sealing position and between the rolls, means independent of the capsule filling mechanism and associated with a mold on each roll for molding empty shells successively from localized areas of the film as it reaches the molding position, said die ledges serving to seal juxtaposed preformed shells and sever a capsule thus formed from the films, means for preheating each film prior to its reaching the molding position, and mechanism for injecting a predetermined quantity of fluid into the premolded empty capsule shells prior to the completion of the sealing thereof.

20. A capsulating machine comprising a pair of die rolls provided with mold cavities surrounded by sealing and severing ledges, means for leading two strips of film over and between the rolls, means for shaping shells from localized areas of the films passing over the mold cavities, said ledges serving to seal opposed shells and sever the capsule thus formed from the films, means for drawing the perforated film netting away from the rolls, and mechanism, including a fixed stripper and a spring pressed, movable stripper yieldingly engaging the opposite sides of the netting, which removes therefrom any adhering capsules.

BENJAMIN C. COWLEY.